United States Patent
Zubkow et al.

(10) Patent No.: US 8,413,931 B2
(45) Date of Patent: Apr. 9, 2013

(54) SYSTEM AND METHOD FOR REDUCING ATTITUDE ERRORS FOR EXOATMOSPHERIC DEVICES

(75) Inventors: Zygmunt Zubkow, Palm Harbor, FL (US); Jeff Hegg, N. Reddington Beach, FL (US)

(73) Assignee: Honeywell International Inc., Morristown, NJ (US)

( * ) Notice: Subject to any disclaimer, the term of this patent is extended or adjusted under 35 U.S.C. 154(b) by 1628 days.

(21) Appl. No.: 11/531,591

(22) Filed: Sep. 13, 2006

(65) Prior Publication Data

US 2008/0121055 A1    May 29, 2008

(51) Int. Cl.
*B64G 1/28* (2006.01)

(52) U.S. Cl.
USPC ............. 244/165; 244/164; 701/13; 701/226; 342/355

(58) Field of Classification Search ............... 244/164, 244/165; 701/13, 226; 342/355
See application file for complete search history.

(56) References Cited

U.S. PATENT DOCUMENTS

| | | | | |
|---|---|---|---|---|
| 3,362,229 A * | 1/1968 | Trueblood | 73/504.02 |
| 3,558,078 A * | 1/1971 | Lanzaro | 244/169 |
| 3,591,108 A * | 7/1971 | Perkel et al. | 244/165 |
| 3,830,447 A * | 8/1974 | Phillips | 244/170 |
| 3,866,025 A * | 2/1975 | Cavanagh | 701/13 |
| 3,998,409 A * | 12/1976 | Pistiner | 244/165 |
| 3,999,729 A * | 12/1976 | Muhlfelder et al. | 244/165 |
| 5,441,222 A * | 8/1995 | Rosen | 244/165 |
| 5,476,239 A * | 12/1995 | Brainard | 244/171 |
| 5,816,538 A * | 10/1998 | Challoner et al. | 244/170 |
| 6,032,903 A * | 3/2000 | Fowell et al. | 244/165 |
| 6,145,790 A * | 11/2000 | Didinsky et al. | 244/164 |
| 6,282,467 B1 * | 8/2001 | Shah et al. | 701/13 |
| 6,285,927 B1 * | 9/2001 | Li et al. | 701/13 |
| 6,298,288 B1 * | 10/2001 | Li et al. | 701/13 |
| 6,595,469 B2 * | 7/2003 | Li et al. | 244/158.1 |
| 6,615,117 B2 | 9/2003 | Li et al. | |
| 2007/0023567 A1 * | 2/2007 | Lindquist et al. | 244/3.1 |

* cited by examiner

*Primary Examiner* — Philip John Bonzell

(74) *Attorney, Agent, or Firm* — Fogg & Powers LLC

(57) ABSTRACT

An exoatmospheric device comprises an inertial measurement unit comprising a spin axis gyroscope adapted to obtain data regarding angular rotation of the exoatmospheric device about a spin axis, and at least one off-spin axis gyroscope adapted to obtain data regarding angular oscillation of the spin axis. The exoatmospheric device further comprises a processing unit coupled to the inertial measurement unit and adapted to detect attitude error by analyzing correlations between the measured rotation about the spin axis and the measured angular oscillation of the spin axis.

6 Claims, 4 Drawing Sheets

SYSTEM AND METHOD FOR REDUCING ATTITUDE ERRORS FOR EXOATMOSPHERIC DEVICES

BACKGROUND

Exoatmospheric devices are devices which are traveling or located in the area of outer space near the Earth's atmosphere. These devices can include satellites, intercontinental ballistic missiles, space vehicles, etc. When in exoatmospheric flight, these devices do not experience any significant external acceleration forces. To navigate, these devices typically use three gyroscopes and three linear accelerometers. The three gyroscopes measure angular motion about 3 orthogonal axes and the three linear accelerometers measure translational movement along those 3 orthogonal axes.

Based on the data received from the gyroscopes and linear accelerometers, a navigation computer is able to determine position, velocity, and attitude which are used to navigate the exoatmospheric devices. Various methods are known for using this data in navigation. In addition, a navigation computer may use a Kalman filter to couple the data from the gyroscopes and linear accelerometers, as well as other sensors such as Global Positioning System (GPS) sensors.

However, sensor error in the data received from sensors, such as gyroscopes and/or linear accelerometers, can negatively affect the navigation calculations. For example, one source of error in measurements and navigation calculations is due to gyroscope scale factor error. Scale factor error is a constant difference between the expected and actual output of a sensor. This scale factor error also has a tendency to vary with temperature changes on the sensor. For example, a gyroscope scale factor of 5 parts per million (ppm) indicates that for every 1 million degrees of rotation detected by the gyroscope, the gyroscope will be inaccurate by up to 5 degrees. A gyroscope detecting rotation of an exoatmospheric device, which is rotating about a spin axis at an exemplary rate of 1000 degrees per second for 1000 seconds, with a 5 ppm scale factor error, would then exhibit an error of 5 degrees. This error adversely affects attitude and position measurements. Inaccurate measurements of attitude and position, in turn, adversely affect navigation of the exoatmoshperic device.

Exoatmospheric conditions make it difficult to detect and correct for some errors, such as gyroscope scale factor error, due to the lack of external acceleration forces. One method of dealing with gyroscope scale factor error is to use high accuracy gyroscopes on a spin axis. For example, one typical high accuracy gyroscope has a gyroscope scale factor of 0.3 ppm. By minimizing gyroscope scale factor, these high accuracy gyroscopes improve the accuracy of navigation calculations. However, these high accuracy gyroscopes can be very expensive and cost prohibitive.

SUMMARY

The above-mentioned problems and other problems are resolved by the present invention and will be understood by reading and studying the following specification.

In one embodiment, an exoatmospheric device is provided. The exoatmospheric device comprises an inertial measurement unit comprising a spin axis gyroscope adapted to obtain data regarding angular rotation of the exoatmospheric device about a spin axis, and at least one off-spin axis gyroscope adapted to obtain data regarding angular oscillation of the spin axis. The exoatmospheric device further comprises a processing unit coupled to the inertial measurement unit and adapted to detect attitude error by analyzing correlations between the measured rotation about the spin axis and the measured angular oscillation of the spin axis.

DRAWINGS

DETAILED DESCRIPTION

Figure 1:
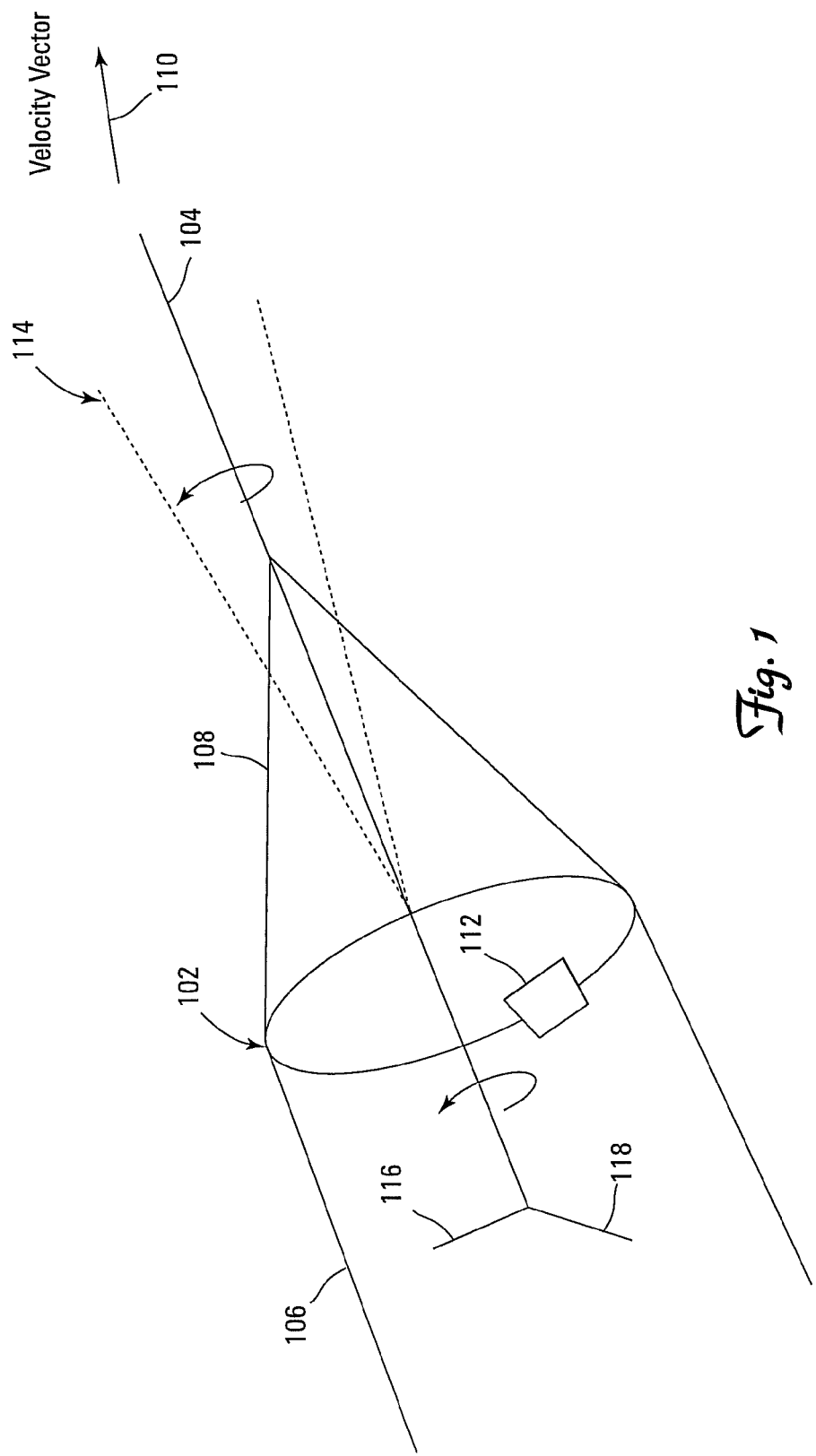
FIG. 1 depicts an exoatmospheric device rotating about a spin axis.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. It should be understood that the exemplary method illustrated may include additional or fewer steps or may be performed in the context of a larger processing scheme. Furthermore, the method presented in the drawing figures or the specification is not to be construed as limiting the order in which the individual steps may be performed. The following detailed description is, therefore, not to be taken in a limiting sense.

Embodiments of the present invention enable the detection of and correction for attitude errors based on a correlation between the rotation of an exoatmospheric device about a spin axis and the angular oscillation of the exoatmospheric device around the spin axis. The term "Attitude errors," as used herein, refers to sensor errors which affect the measured attitude of the exoatmospheric device. For example, embodiments of the present invention detect and correct for spin axis gyroscope scale factor errors. However, it is to be understood that other types of attitude errors can be detected based on a correlation between the rotation of an exoatmospheric device about a spin axis and the angular oscillation of the exoatmospheric device around the spin axis. By correcting for sensor scale factor errors, embodiments of the present invention also enable accurate navigation of exoatmospheric device without requiring high precision gyroscopes.

FIG. 1 depicts an exoatmospheric device 102 rotating about a spin axis 104. Although exoatmospheric device 102 is depicted as having a tube body 106 and cone-shaped nose 108, embodiments of the present invention are not to be so limited. Exoatmospheric device 102 can be implemented as an intercontinental ballistic missile, satellite, space vehicle, etc. Exoatmospheric device 102 is rotating about spin axis 104 and traveling in the direction of velocity vector 110. As can be seen in FIG. 1, velocity vector 110 is not necessarily aligned with spin axis 104. Exoatmospheric device 102 includes inertial measurement unit (IMU) 112. IMU 112 is adapted to detect angular acceleration about three orthogonal axes, including spin axis 104, and linear acceleration along the three orthogonal axes. IMU 112, in this example, includes three gyroscopes and three linear accelerometers. IMU 112 can be located on spin axis 104 or displaced from spin axis 104.

As depicted in FIG. 1, spin axis 104 of exoatmospheric device 102 undergoes torque-induced angular oscillation as indicated by angular oscillation cone 114 and is not necessarily collocated with spin axis 104. In other words, spin axis 104 "wobbles" due to applied torque on spin axis 104 and marks out angular oscillation cone 114. It is to be understood that angular oscillation cone 114 is provided merely by way of example. Actual angular oscillation of spin axis 104 may mark out an angular oscillation cone smaller or larger than angular oscillation cone 114. The angular oscillation of spin axis 104 generates oscillations of exoatmospheric device 102 about off-spin axes 116 and 118. The term off-spin axis, as used herein refers to an axis that is orthogonal to the spin axis. Therefore, spin axis 104, off-spin axis 116, and off-spin axis 118 are orthogonal to each other. IMU 112 detects both the angular rotation of exoatmospheric device 102 about spin axis 104 and the torque-induced angular oscillation of spin axis 104.

Figure 2:
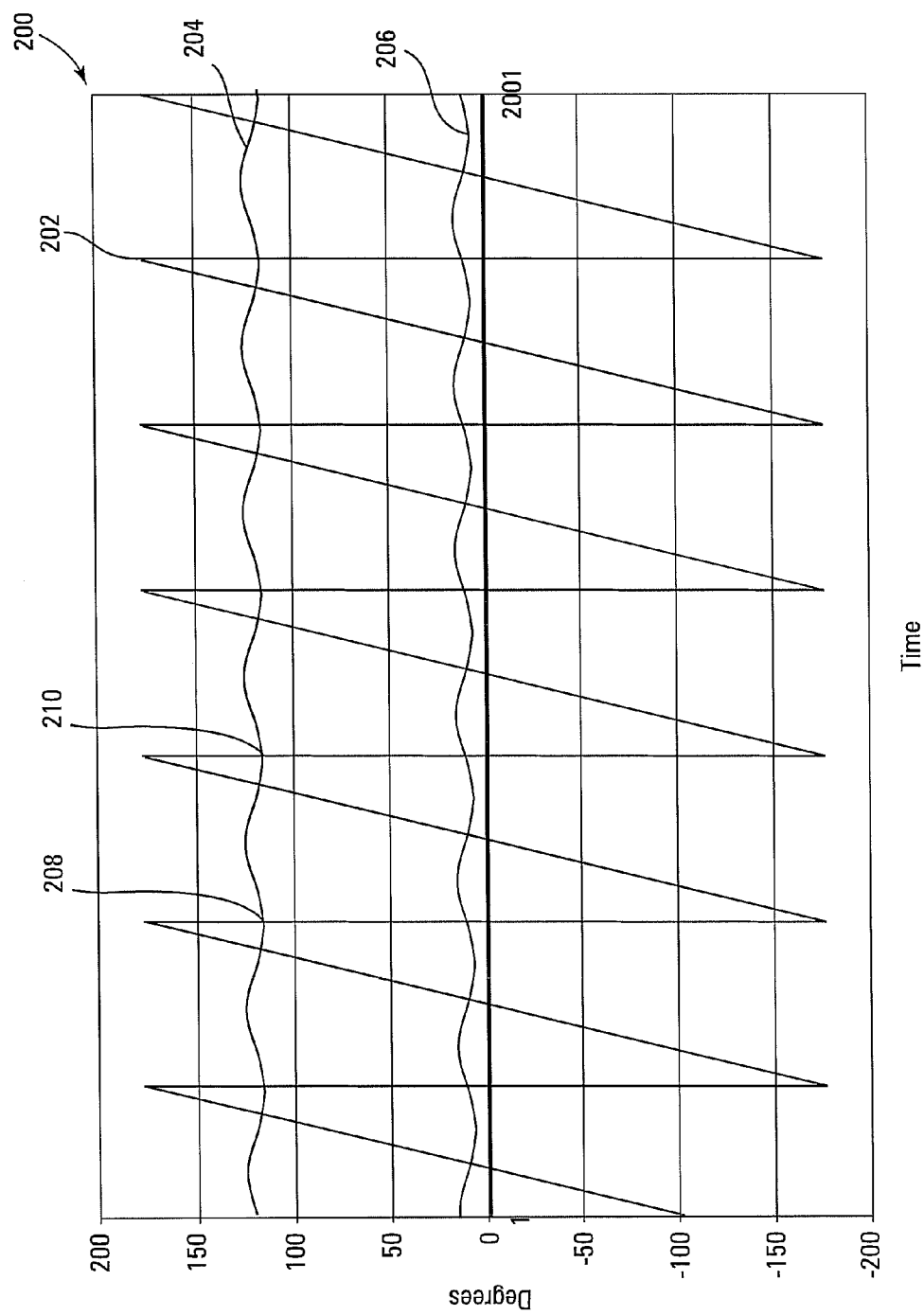
FIG. 2 is a chart showing angular acceleration and angular oscillation of an exoatmospheric device.

FIG. 2 is a chart 200 showing angular rotation and angular oscillation of an exoatmospheric device, such as exoatmospheric device 102. The exemplary data shown in chart 200 is obtained from an IMU such as IMU 112. The vertical axis of chart 200 indicates degrees of rotation and the horizontal axis indicates time elapsed. Line 202 graphically presents the angular rotation of the exoatmospheric device about the spin axis. Line 204 graphically presents the angular rotation of the exoatmospheric device about a first off-spin axis (e.g. spin axis 116) which is orthogonal to the spin axis. Line 206 graphically presents the angular rotation of the exoatmospheric device about a second off-spin axis (e.g. spin axis 118) which is orthogonal to both the spin axis and the first off-spin axis.

Lines 204 and 206 result from the angular oscillation of the spin axis of the exoatmospheric device as described in FIG. 1. Due to the lack of external acceleration forces, the rotation of an exoatmospheric device about the spin axis as well as the torque-induced angular oscillation will remain constant while in exoatmospheric areas. Hence, the period and phase of lines 202, 204, and 206 will also remain constant. Line 202 appears as triangular wave in chart 200 because the exoatmospheric device is spinning in complete 360 degree rotations and, on chart 200, 180 degrees and −180 degrees represent the same physical rotation point. Similarly, lines 204 and 206 are sinusoidal in shape indicating the constant angular oscillation of the spin axis.

As can be seen, there is a correlation between the periods and phases of lines 202, 204, and 206. For example, one period of line 202 can be seen between period end points 208 and 210. Points 208 and 210 are referred to as period end points because they mark the point where one period ends and another begins. The segment of lines 204 and 206 between end points 208 and 210 should remain the same for each period of line 202. In particular, the value (e.g. degree of rotation) of each of lines 204 and 206 which corresponds in time to end points 208 and 210 should remain constant. Similarly, the value of line 202 which corresponds in time to period end points for line 204 and/or line 206 should remain constant while in exoatmospheric flight.

However, the spin axis gyroscope scale factor will introduce error and slightly alter the correlation of line 202 with lines 204 and 206 causing the relative phase of lines 202, 204, and 206 to change. These changes can be detected by analyzing the values of each of lines 204 and 206 which corresponds to end points 208 and 210. Since the phase and period of each of lines 202, 204, and 206 remain constant, the corresponding values of each of lines 204 and 206 should not change. Therefore, any detected change is an indication of spin axis gyroscope scale factor error. Similarly, an analysis of the values of line 202 which correspond to period end points of lines 204 and 206 can also be used to detect spin axis gyroscope scale factor error.

By examining the correlation of line 202 with lines 204 and 206, spin axis gyroscope scale factor can be detected and corrected. Only one of lines 204 and 206 is needed to correlate with line 202 for detecting the spin axis gyroscope scale factor. However, by using both lines 204 and 206, improved accuracy is provided by analyzing the correlation of line 202 with each of lines 204 and 206 to verify the amount of spin axis gyroscope scale factor error. In particular, the analysis of the correlation of line 202 with line 204 can be compared with the analysis of the correlation of line 202 with line 206. In this way, detected error can be improved.

Figure 3:
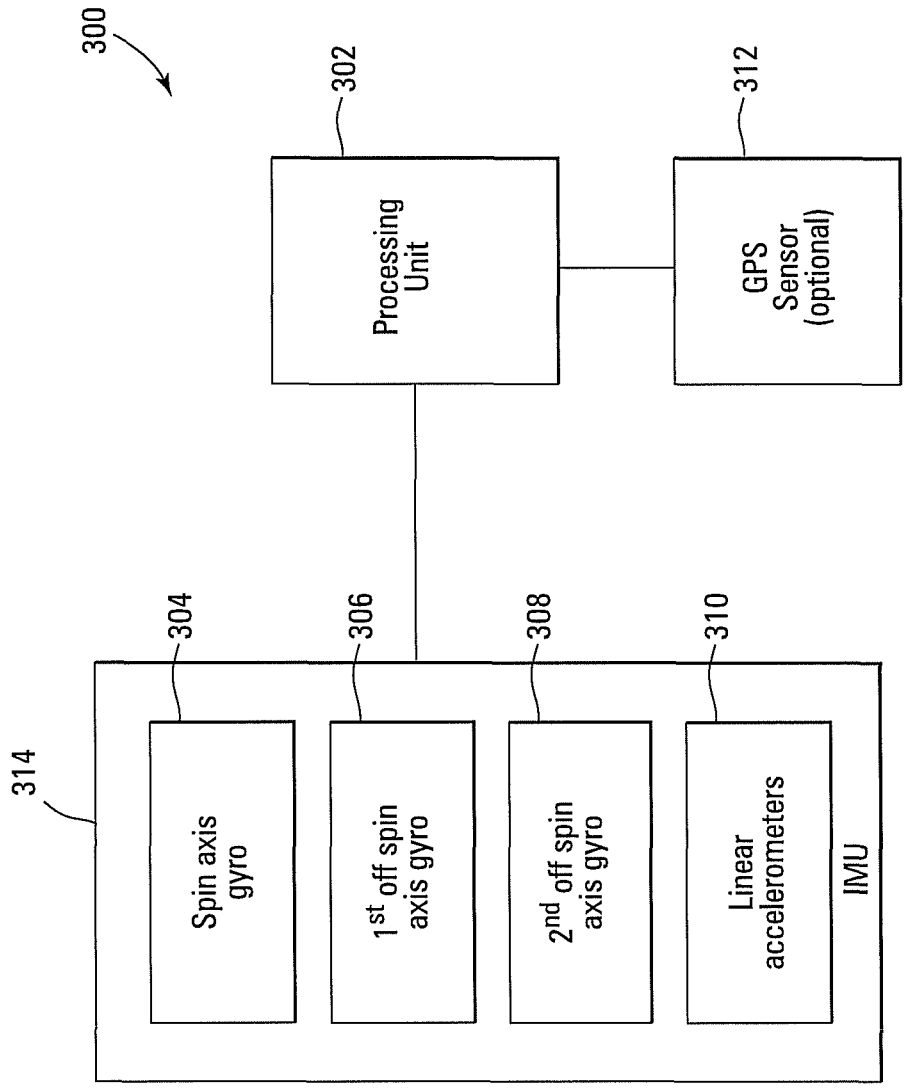
FIG. 3 is a high level block diagram of a navigation system according to one embodiment of the present invention.

FIG. 3 is a high level block diagram of a navigation system 300 in an exoatmospheric device (e.g. exoatmospheric device 102) according to one embodiment of the present invention. Navigation system 300 detects and corrects attitude errors, such as spin axis gyroscope scale factor error, by analyzing the correlation between rotation about a spin axis and torque-induced angular oscillation of the spin axis as described above in FIGS. 1 and 2.

Navigation system 300 includes spin axis gyroscope 304, first off-spin axis gyroscope 306, and second off-spin axis gyroscope 308 which measure angular rotation about three orthogonal axes. In particular, spin axis gyroscope 304 obtains spin data of the exoatmospheric device about a spin axis (e.g. spin axis 104 in FIG. 1) whereas off-spin axes 306 and 308 measure angular rotation about orthogonal off-spin axes (e.g. off-spin axes 116 and 118 in FIG. 1). Linear accelerometers 310 measure translational movement along the three orthogonal axes. In some embodiments, linear accelerometers 310, spin axis gyroscope 304, first off-spin axis gyroscope 306, and second off-spin axis gyroscope 308 are located together in inertial measurement unit 314, such as IMU 112 in FIG. 1.

In addition, in some embodiments navigation system 300 includes additional sensors coupled to processing unit 302, such as GPS sensor 312. Data from GPS sensor 312 is used to enhance calculations of position, attitude, and velocity. The data from GPS sensor is blended with the data from the gyroscopes and linear accelerometers through known techniques, such as with a Kalman filter.

IMU 314 is coupled to processing unit 302. Processing unit 302 is adapted to calculate position, velocity, and attitude based on the data received from IMU 314. The calculated position, velocity, and attitude are then used in navigating the exoatmospheric device. In addition, processing unit 302 is adapted to correlate spin data and angular oscillation data. Angular oscillation data refers to data regarding oscillations of the exoatmospheric device about two orthogonal off-spin axes due to angular oscillation of the spin axis, as described above. For example, processing unit 302 correlates a period end value of spin data with the value of angular oscillation data that corresponds in time to the spin data period end value. Alternatively, processing unit 302 correlates a period end value of angular oscillation data with the value of spin data that corresponds in time to the angular oscillation data period end value.

Processing unit 302 is adapted to monitor the correlation between the spin data and the angular oscillation data. For example, in one embodiment, processing unit 302 is adapted to monitor the correlation by periodically comparing a period end value of the angular oscillation data to a corresponding value of the spin data. If the corresponding value of the spin data is not the expected value based on the prior correlation, spin axis gyroscope scale factor error has been detected. However, it is to be understood that, in other embodiments, analysis of a correlation between the spin data and the angular oscillation data can be performed differently. For example, in some embodiments, analysis of the correlation includes incorporating data from other sensors, such as a GPS sensor and/or linear accelerometers.

Although only one off-spin axis is needed to detect gyroscope scale factor error, in this example, processing unit 302 receives angular oscillation data from both first off-spin axis gyroscope 306 (also referred to as first-off axis angular oscillation data) and second off-spin axis gyroscope 308 (also referred to as second-off axis angular oscillation data). Processing unit 302 correlates the spin data with the angular oscillation data from each of the off-spin axes 306 and 308. Furthermore, in some embodiments, processing unit 302 monitors the correlation between the spin data and the angular oscillation data from each of the off-spin axes. In such embodiments, processing unit 302 compares any changes in the correlation between the spin data and the angular oscillation data from first off-spin axis gyroscope 306 with any changes in the correlation between the spin data and the angular oscillation data from second off-spin axis gyroscope 308. This comparison enables higher accuracy since the data from each off-spin axis can be verified with the data from the other off-spin axis.

When changes are detected, processing unit 302 adjusts navigation calculations (such as the calculated position, velocity, and attitude) to correct for the gyroscope scale factor error. In particular, in some embodiments, processing unit 302 adjusts the phase of the spin data to correct for detected gyroscope scale factor errors. Also, in some embodiments, previously calculated position, velocity, and/or attitude values are updated using spin data with corrected phase. Hence, embodiments of the present invention enable detection of and correction for spin axis gyroscope scale factor error without the need for high precision gyroscopes which can be very costly. For example, spin axis gyroscope 304 can operate with a gyroscope scale factor of more than 5 parts per million whereas some high precision gyroscopes operate with a gyroscope scale factor of approximately 0.3 parts per million. However, it is to be understood that embodiments of the present invention can also use high precision gyroscopes.

Instructions for carrying out the various process tasks, calculations, and generation of signals and other data used in the operation of system 300 to detect and correct for gyroscope scale factor can be implemented in software, firmware, or other computer readable instructions. These instructions are typically stored on any appropriate computer readable medium used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks (e.g., floppy disks); magneto-optical disks; CDs, DVDs, or other optical storage disks; nonvolatile ROM, RAM, and other like media. Any of the foregoing may be supplemented by, or incorporated in, specially-designed application-specific integrated circuits (ASICs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

Figure 4:
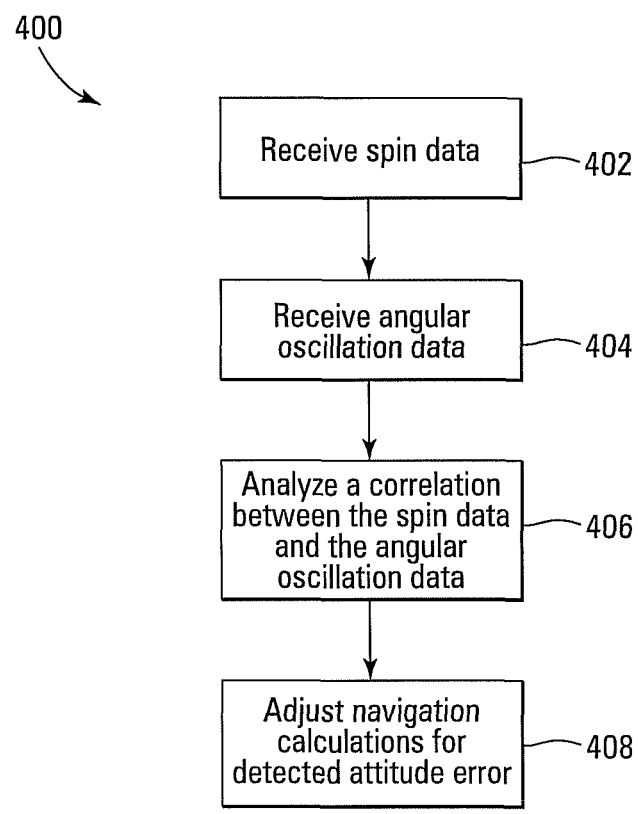
FIG. 4 is a flow chart showing a method of compensating for attitude error according to one embodiment of the present invention.

FIG. 4 is a flow chart showing a method 400 of compensating for attitude error according to one embodiment of the present invention. For example, method 400 can be used to compensate for spin axis gyroscope scale factor error. At 402, spin data is received from a spin axis gyroscope (e.g. spin axis gyroscope 304). The spin data contains angular rotation measurements of an exoatmospheric device about the spin axis. At 404, angular oscillation data is received from at least one off-spin axis gyroscope (e.g. first off-spin axis gyroscope 306 and second off-spin axis gyroscope 308 in FIG. 3). The angular oscillation data contains angular rotation measurements of angular oscillation of the spin axis of the exoatmospheric device.

At 406, a correlation between the spin data and the angular oscillation data is analyzed to detect attitude error, such as spin axis gyroscope scale factor error. For example, in one embodiment, analysis of the correlation between the spin data and the angular oscillation data comprises periodically comparing a period end value of the angular oscillation data to a value of the spin data corresponding to the angular oscillation data in time, wherein a change in the corresponding value of the spin data indicates spin axis gyroscope scale factor error. However, it is to be understood that, in other embodiments, analysis of a correlation between the spin data and the angular oscillation data can be performed differently. For example, in some embodiments, analysis of the correlation includes incorporating data from other sensors, such as a GPS sensor and/or linear accelerometers.

In addition, in some embodiments, angular oscillation data is received from two off-spin axis gyroscopes. In such embodiments, analyzing the correlation between the spin data and the angular oscillation data comprises analyzing a first correlation between the spin data and the angular oscillation data from the first off-spin axis gyroscope (also referred to as first off-axis angular oscillation data) and analyzing a second correlation between the spin data and the angular oscillation data from the second off-spin axis gyroscope (also referred to as second-off axis angular oscillation data. The analysis of the first correlation can then be compared with the analysis of the second correlation. This enables improved accuracy by enabling comparison of the values to verify detected gyroscope scale factor errors.

At 408, navigation calculations are adjusted when attitude error, such as gyroscope scale factor error, is detected. Adjusting navigation calculations includes, in one embodiment, adjusting the phase of the spin data to restore the original correlation between the spin data and the angular oscillation data for use in calculating position and attitude. In addition, adjusting navigation calculations includes, in some embodiments, updating previously calculated position and attitude values with the corrected spin data.

Although specific embodiments have been illustrated and described herein, it will be appreciated by those of ordinary skill in the art that any arrangement, which is calculated to achieve the same purpose, may be substituted for the specific embodiment shown. For example, although detection of gyroscope scale factor error is discussed above, embodiments of the present invention can also be used to detect other types of attitude error. This application is intended to cover any adaptations or variations of the present invention. Therefore, it is manifestly intended that this invention be limited only by the claims and the equivalents thereof.

What is claimed is:

1. A method of compensating for attitude error in an exoatmospheric device, the method comprising:
   receiving spin data from a spin axis gyroscope in the exoatmospheric device, wherein the spin data contains angular rotation measurements of the exoatmospheric device about the spin axis, the exoatmospheric device spinning in complete rotations about the spin axis;
   receiving angular oscillation data from at least one off-spin axis gyroscope, wherein the angular oscillation data contains angular rotation measurements of angular oscillation of the spin axis of the exoatmospheric device;
   analyzing a correlation between the spin data and the angular oscillation data to detect attitude error; and
   adjusting the attitude of the exoatmospheric device by adjusting navigation calculations when attitude error is detected.

2. The method of claim 1, wherein analyzing a correlation between the spin data and the angular oscillation data to detect attitude error comprises analyzing a correlation between the spin data and the angular oscillation data to detect spin axis gyroscope scale factor error.

3. The method of claim 1, wherein analyzing a correlation between the spin data and the angular oscillation data comprises periodically comparing a period end value of the angular oscillation data to a corresponding value of the spin data, wherein a change in the corresponding value of the spin data indicates attitude error.

4. The method of claim 1, wherein analyzing a correlation between the roll data and the angular oscillation data further comprises:
   analyzing a first correlation between the spin data and angular oscillation data from a first off-spin axis gyroscope;
   analyzing a second correlation between the spin data and angular oscillation data from a second off-spin axis gyroscope; and
   comparing the analysis of the first correlation with the analysis of the second correlation.

5. The method of claim 1, wherein adjusting navigation calculations comprises adjusting phase of the spin data based on detected attitude error.

6. The method of claim 5, wherein adjusting navigation calculations comprises updating previously calculated position data with spin data adjusted for detected attitude error.

* * * * *